(12) United States Patent
Brooke (10) Patent No.: US 7,456,849 B2
(45) Date of Patent: Nov. 25, 2008

(54) SYSTEM AND METHOD FOR ZOOMING AN OBJECT THROUGH SPIRAL INTERACTION

(75) Inventor: Timothy Lawrence Brooke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/106,901

(22) Filed: Apr. 15, 2005

(65) Prior Publication Data

US 2006/0232611 A1    Oct. 19, 2006

(51) Int. Cl.
*G09G 5/00*    (2006.01)
*G06F 3/033*    (2006.01)

(52) U.S. Cl. ................................. 345/661; 715/863

(58) Field of Classification Search ................. 715/863; 345/661
See application file for complete search history.

(56) References Cited

U.S. PATENT DOCUMENTS

| | | | | |
|---|---|---|---|---|
| 5,345,543 A | * | 9/1994 | Capps et al. | ................. 345/654 |
| 6,249,606 B1 | * | 6/2001 | Kiraly et al. | ................. 382/195 |
| 2002/0089521 A1 | * | 7/2002 | Maruyama et al. | .......... 345/660 |
| 2004/0051695 A1 | * | 3/2004 | Yamamoto et al. | .......... 345/156 |
| 2004/0196267 A1 | * | 10/2004 | Kawai et al. | ................. 345/173 |
| 2005/0162413 A1 | * | 7/2005 | Dresevic et al. | ............. 345/179 |
| 2006/0029296 A1 | * | 2/2006 | King et al. | .................... 382/313 |
| 2006/0139321 A1 | * | 6/2006 | Sakaguchi | .................. 345/156 |
| 2006/0227139 A1 | * | 10/2006 | Momose | ...................... 345/441 |
| 2007/0083826 A1 | * | 4/2007 | Pessetto et al. | ............. 715/800 |

OTHER PUBLICATIONS

Bier et al., "Toolglass and Magic Lenses: The See Through Interface", Xerox, 1993.*

* cited by examiner

*Primary Examiner*—Ulka Chauhan
*Assistant Examiner*—Jeffrey J Chow
(74) *Attorney, Agent, or Firm*—Merchant & Gould; Ryan T. Grace (57) ABSTRACT

A system and method for zooming an object through a spiral movement of a pointer. The method provides three-dimensional interaction with an object in response to a two-dimensional pointer input. The method includes monitoring pointer movements to determine whether a movement indicates a spiral movement. When a spiral movement is determined an object is zoomed. A clockwise spiral movement may zoom an object inwardly and a counterclockwise movement may zoom an object outwardly. A non-spiral movement may pan the object.

15 Claims, 5 Drawing Sheets

SYSTEM AND METHOD FOR ZOOMING AN OBJECT THROUGH SPIRAL INTERACTION

BACKGROUND OF THE INVENTION

Cellular telephones, personal computers, stationary computers, mobile computers, and other computing devices are fast becoming mainstream modes for personal enjoyment, communication, and data manipulation. Often, computing devices are used to interact with objects such as maps, photographs, images, pictures, text, etc. Interaction may include panning an object, zooming an object inwardly, or zooming an object outwardly. Typically, a user must navigate several screens in order to pan and zoom an object. A user may also be required to use special tools such as a zooming icon in order to zoom an object. Such interaction decreases the efficiency of the device and complicates the navigation of objects.

SUMMARY OF THE INVENTION

Aspects of the present invention relate to a system and method for zooming an object through spiral interaction. Stated another way, aspects of the present invention relate to a system and method for using a two-dimensional input device to provide three-dimensional interaction with an object. In accordance with one aspect, moving a pointer in a non-spiral manner allows panning of an object. In another aspect, moving a pointer in a spiral manner allows object zooming. In one embodiment, a clockwise spiral movement zooms-in an object and a clockwise spiral movement zooms-out an object.

Other aspects of the present invention include sampling a pointer movement. An input sampler may sample the position of a pointer over time. The position may include a two-dimensional rectangular coordinate system having an X-axis and a Y-axis, a polar coordinate system, or any other type or coordinate system that facilitates the identification of a pointer position.

Yet other aspects of the present invention include interpreting the pointer position data. An input interpreter may use the pointer movement samples to determine whether the pointer input is a non-spiral input or a spiral input. Succinctly stated, the input interpreter calculates the angle in relation to horizontal between sampled points. If the change in the angle between points is below a determined threshold, the interpreter interprets the movement as a non-spiral input (e.g. linear input). If the change of the angle between points is greater than the determined threshold, the input interpreter interprets the movement as a spiral input.

When a user interacts with an object, a panning function or a zooming function may be performed depending on the identification of the pointer input. When the pointer input is below the determined threshold, a panning function may be invoked to allow the user to pan the object. When the pointer input is above the determined threshold, a zooming function may be invoked to allow the user to zoom-in or zoom-out on the object. In one embodiment, a clockwise spiral zooms-in an object and a counterclockwise spiral zooms-out an object. In another embodiment, the center of the object is zoomed upon invoking a zooming function. In yet another embodiment, the pointer location is zoomed upon invoking a zooming function. In still another embodiment, the speed of the zoom is associated with the speed of the pointer input.

These and other aspects of the present invention will be evident in light of the disclosure set forth below.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure is enabling through embodiments that will convey the full scope of the invention to those of skill in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a System and Method for Zooming an Object Through Spiral Interaction Succinctly stated, aspects of the present invention include a system and method for zooming an object through spiral interaction. Aspects of the present invention also include three-dimensional object navigation with a two-dimensional pointer input. In one embodiment, a user may pan an object by moving a pointer in a non-spiral manner in the direction of the desired panning. In another embodiment, upon a clockwise spiral movement with the pointer, the object is zoomed inwardly. In another embodiment, upon a counterclockwise movement, the object is zoomed outwardly. As referenced herein, a spiral movement may include a generally spiral-type movement, a circular movement, a generally circular movement, an arcuate movement or any combination thereof.

Figure 3:
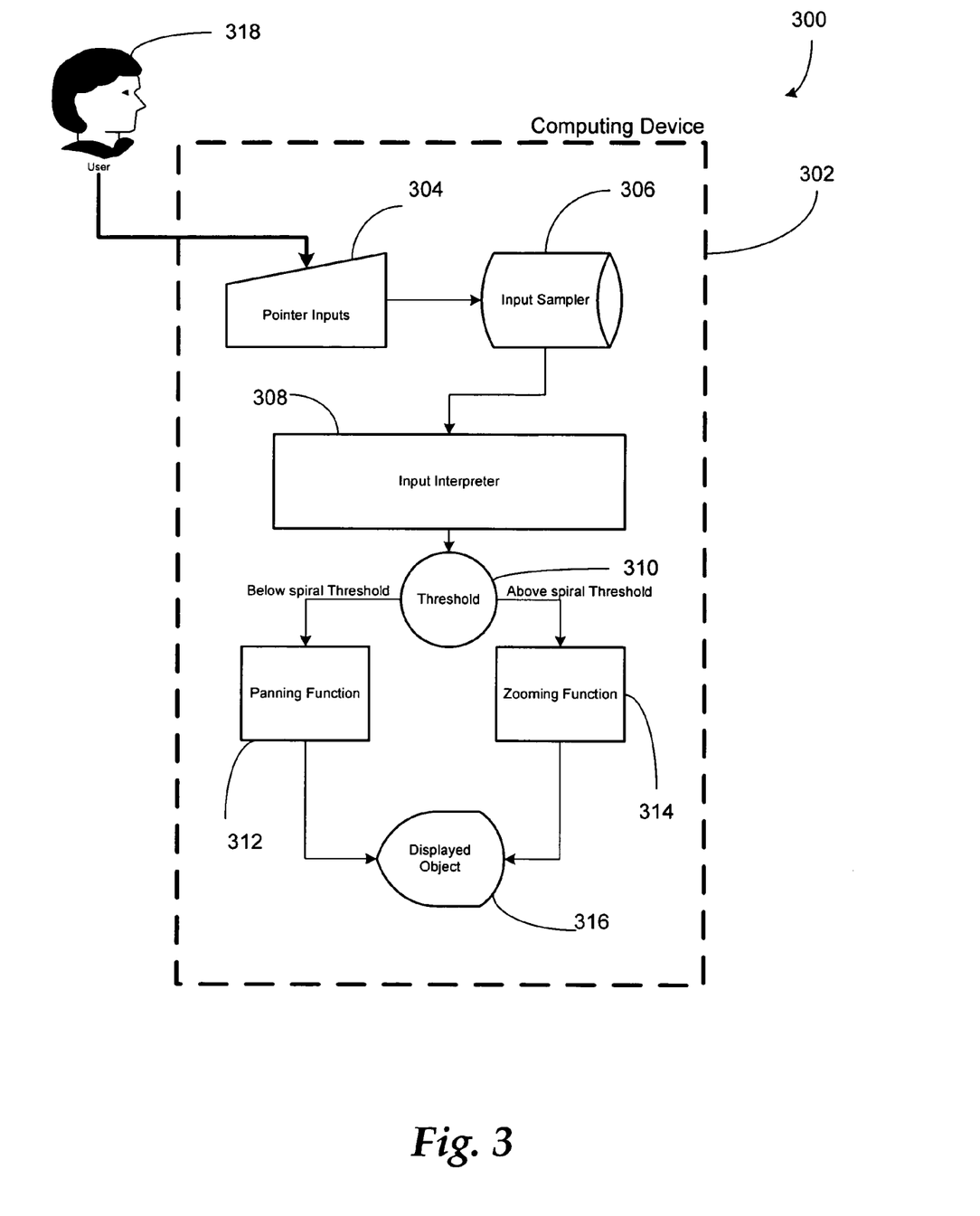
FIG. 3 represents one exemplary modular system for zooming an object through spiral interaction that may be used in one embodiment of the present invention.

FIG. 3 represents one exemplary system 300 for zooming an object through spiral interaction. System 300 represents a modular overview of the present invention. System 300 may be integrated as a combination of software and hardware elements, an operating system or any combination thereof. Hardware, databases, software or applications referenced herein may be integrated as a single element or include various elements in communication with one another. Software and/or hardware elements are depicted herein for explanatory purposes only and not for limiting the configuration to multiple elements or a single element performing several functions. For example, in FIG. 3, computing device 302 may include pointer inputs 304 and input sampler 306 that samples pointer inputs 304. Input interpreter 308 may use the samples to determine if the samples meet threshold 310. Depending on the interpretation, panning function 312 or zooming function 314 may be invoked on object 316. Reference numbers 304-316 may include separate programs, separate databases and separate hardware. Reference numbers 304-316 may also include a single program or any combination of single and multiple programs. Also, system 300 may be included as one or more elements of an operating system.

Figure 1:
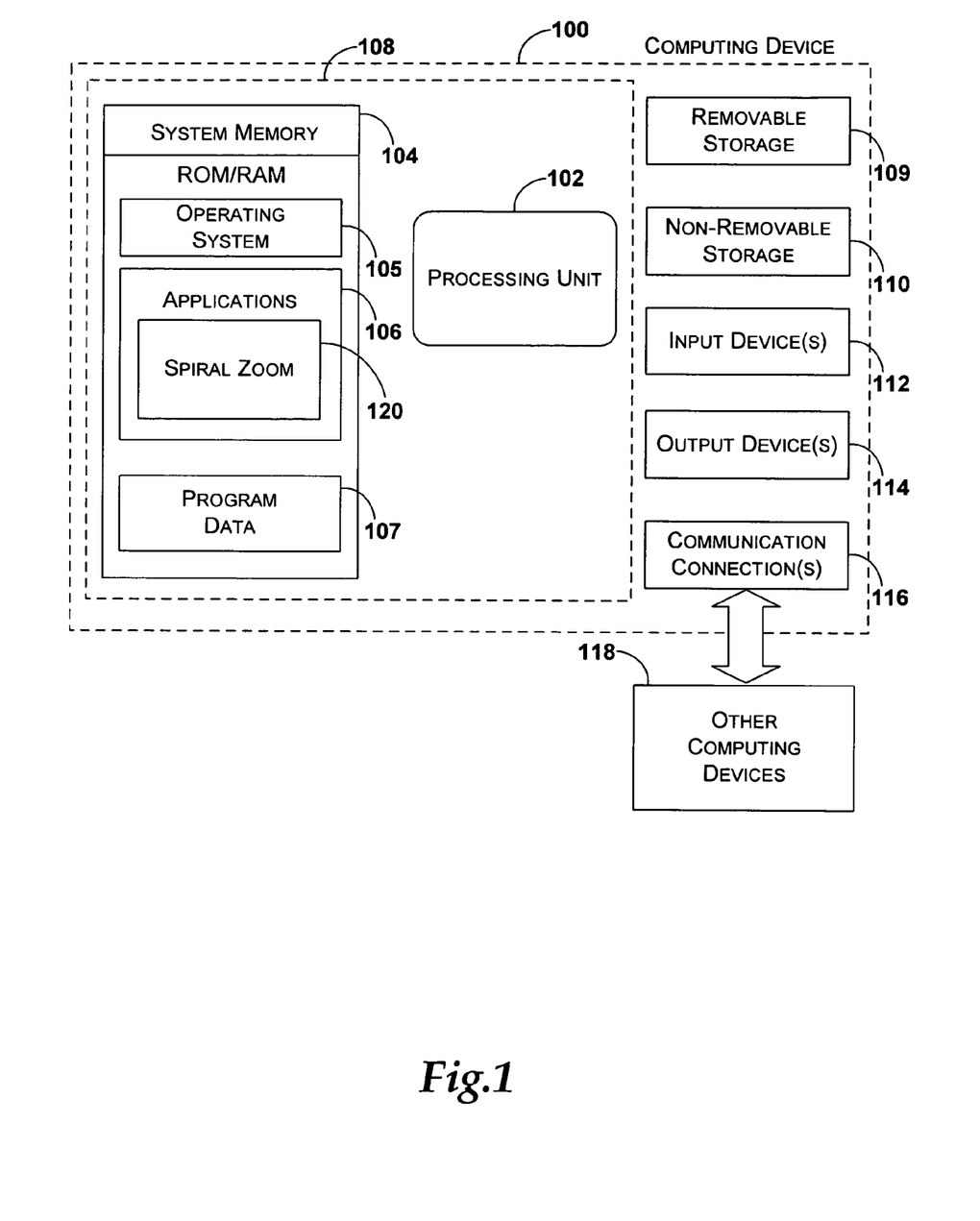
FIG. 1 illustrates an exemplary computing device that may be used in one aspect of the present invention.
Figure 2:
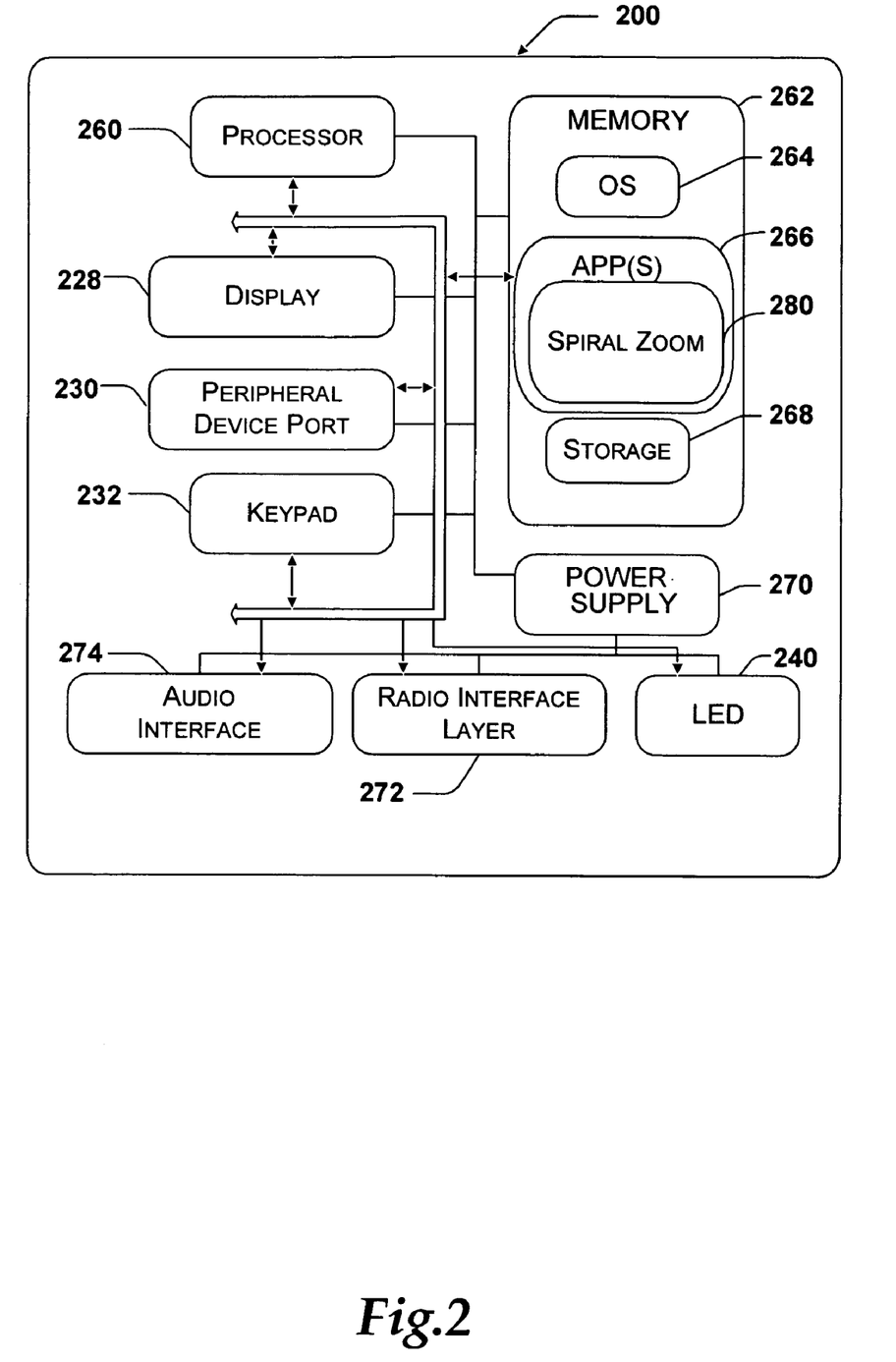
FIG. 2 illustrates an exemplary mobile device that may be used in one aspect of the present invention.

Computing device 302 may include computing device 100 as exemplified in FIG. 1 or computing device 302 may include mobile computing device 200 as exemplified in FIG. 2. Computing device 302 may include a telephone, cellular telephone, satellite telephone, stationary computing device, mobile computing device, televising device, mobile audio device, watch device, or any other device that may implement zooming an object through spiral interaction. As referenced herein, user 318 may use any type of input device to control a pointer of computing device 302. Input devices may include a mouse, stylist, finger, touch pad, joystick, keyboard, game controller, pointer button or any other device that may be used to move a pointer on a display.

Figure 4:
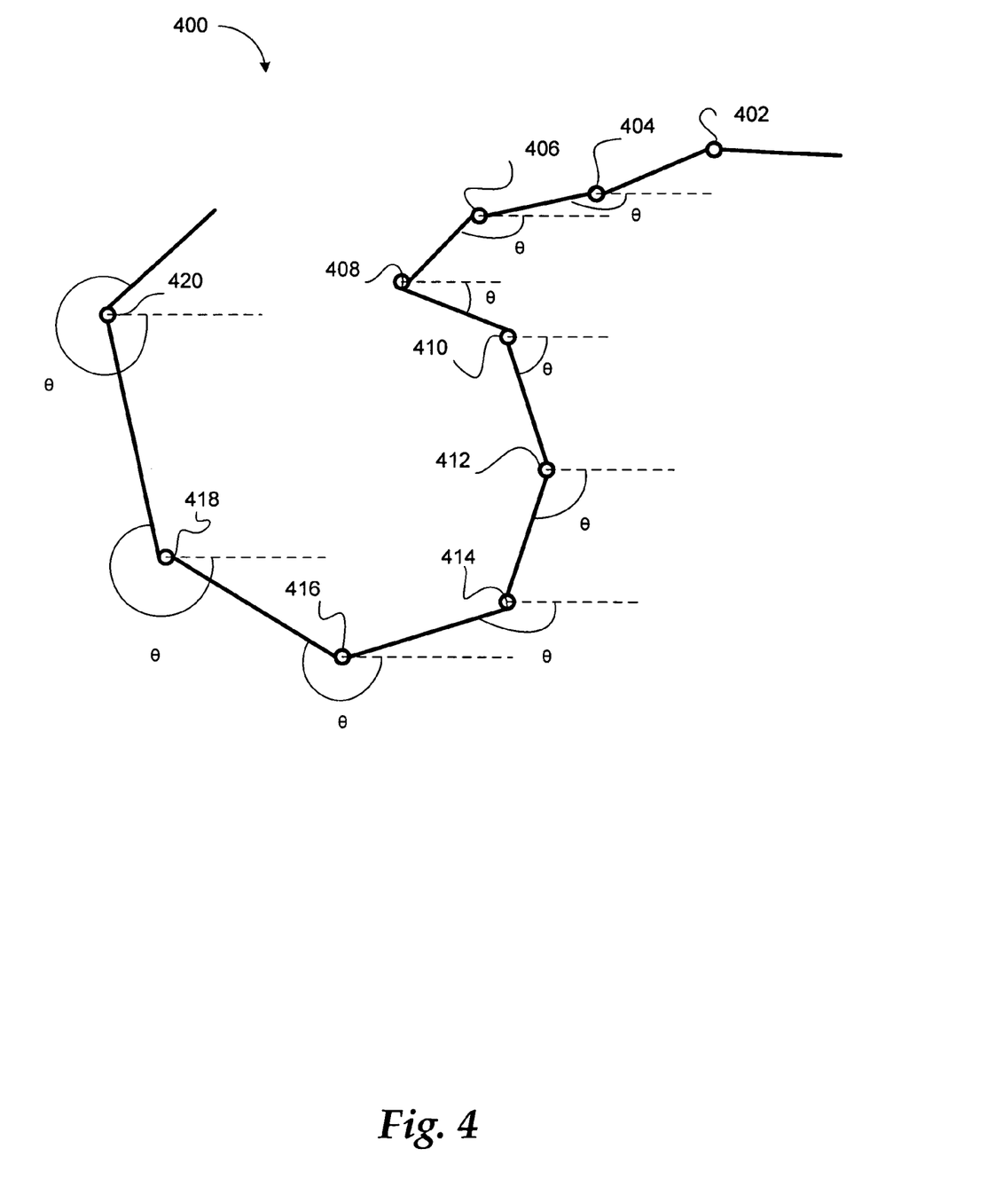
FIG. 4 represents an exemplary pointer movement that may be referenced to illustrate one embodiment of the present invention.

Pointer inputs 304 may include any type of input that user 318 makes with an input device. For example, FIG. 4 represents an exemplary pointer movement 400 that is referenced herein for exemplary purposes. Pointer movement 400 may include a random input from a pointer, an interaction with an object or any other type of input as the user navigates a pointer on a display.

Input sampler 306 may sample pointer inputs 304 over time. For example, in FIG. 4, reference numbers 402-420 may represent samples of pointer movement 400. Input sampler 306 may record the position of the pointer at a time. The position may include a two-dimensional rectangular coordinate system having an X-axis and a Y-axis. Input sampler 306 may record the X and Y positions of the pointer at a time. The frequency or rate of sampling may include any rate of sampling that facilitates the identification of a user movement (e.g. a linear input, an arcuate input or any combination thereof). Some factures that may determine the rate of sampling include resolution, pixel size, speed of the pointer movement and processor speed of computing device 302. Even though a two-dimensional rectangular coordinate system is referenced herein, the present invention may also use a polar coordinate system or any other type of coordinate system that facilitates the identification of a spiral input as is defined below.

Input interpreter 308 may use the samplings from input sampler 306 to determine whether pointer movement 400 is a non-spiral input or a spiral input. Succinctly stated, input interpreter 308 calculates the angle in relation to horizontal between sampled points. If the change in the angular degree between points is less than threshold 310, input interpreter 308 interprets the movement as a non-spiral input. If the change of the angular degree between points is greater than threshold 310, the input interpreter 308 interprets the movement as a spiral input.

Threshold 310 may include any change of angle threshold that distinguishes a spiral input from a non-spiral input. Some factors that may be considered when setting a threshold are resolution, pixel characteristics, input speed capabilities, and sample rate. In general, the higher the sample rate, resolution and pixel characteristics, the more accurately input interpreter 308 can map pointer inputs 304 to determine whether a spiral input has occurred. Other factors may be included in setting threshold 310 as long as the threshold distinguishes a non-spiral input from a spiral input.

With reference to FIG. 4, sample points 402-420 are samples of pointer movement 400. Sample points 402-420 may include position coordinates and time as stated above. Using standard trigonometric formulas, a line may be calculated between the sampled points. For example, input sampler 306 may sample pointer inputs that include sample points 402 and 404. Input sampler 306 may record the position coordinates of the two points. From the position coordinates of points 402 and 404, input interpreter 308 may calculate the line between the points through a standard trigonometric function. This process may continue as indicated by pointer movement 400.

The symbol "θ", in FIG. 4, represents the angle of the calculated line from horizontal. The angle may also be calculated through standard trigonometric functions. For example, between sample points 408 and 410, "θ" may represent an angle of 30 degrees from horizontal. As another example, between sample points 414 and 416, "θ" may represent an angle of 120 degrees from horizontal. Even though "θ" is referenced herein as being the angle calculated from horizontal, "θ" may be calculated from any reference.

As is evident from FIG. 4, when a user makes a non-spiral input (e.g. sample points 402-408), the change of "θ" between the points typically does not fluctuate more than a few degrees. For example, between sample points 404 and 406, "θ" may be 150 degrees from horizontal. Between sample points 406 and 408, "θ" may be 140 degrees from horizontal. This fluctuation may be caused from the steadiness of the user's movement, pixel characteristics, sample rates, screen resolution, etc. This typical fluctuation may be one factor in setting threshold 310 to facilitate distinction between a non-spiral input and a spiral input.

When a user makes a spiral input (e.g. sample points 408-420), "θ" typically increases from horizontal. For example, between sample points 408 and 410, "θ" may be 30 degrees from horizontal. Between sample points 410 and 412, "θ" may be 80 degrees from horizontal. Between sample points 412 and 414, "θ" may be 100 degrees from horizontal, etc. When input interpreter 308 detects a change in "θ" greater than threshold 310, input interpreter 308 determines that the movement is a spiral input. Likewise, a similar calculation may be used when the spiral input is counterclockwise.

When user 318 interacts with an object, panning function 312 or zooming function 314 may be performed depending on the interpretation of the movement. Input interpreter 308 may detect panning and zooming by the same input. In one embodiment, an object includes a map, mapping application, a photo, image, a picture, and/or text. When input interpreter 308 determines that a user movement is less than threshold 310, panning function 312 may be invoked to allow the user to pan the object. When input interpreter 308 determines that a user input is greater than threshold 310, zooming function 314 may be invoked to allow the user to zoom an object inwardly or outwardly. In one embodiment, a clockwise spiral zooms an object inwardly and a counterclockwise spiral zooms an object outwardly. In another embodiment, the center of the object is zoomed upon invoking zooming function 314. In yet another embodiment, the pointer location in reference to the object is zoomed upon invoking zooming function 314. In still another embodiment, the speed of the zooming is associated with the speed of the user movement.

As an example of the present invention, user 318 may desire to interact with a map on a computing device. System 300 allows user 318 to pan the map by moving a pointer in a non-spiral manner. System 300 also allows user 318 to zoom-in and zoom-out on the map by moving the pointer in a spiral-like manner. Accordingly, a two dimensional input device may provide three-dimensional interaction through a spiral input.

Figure 5:
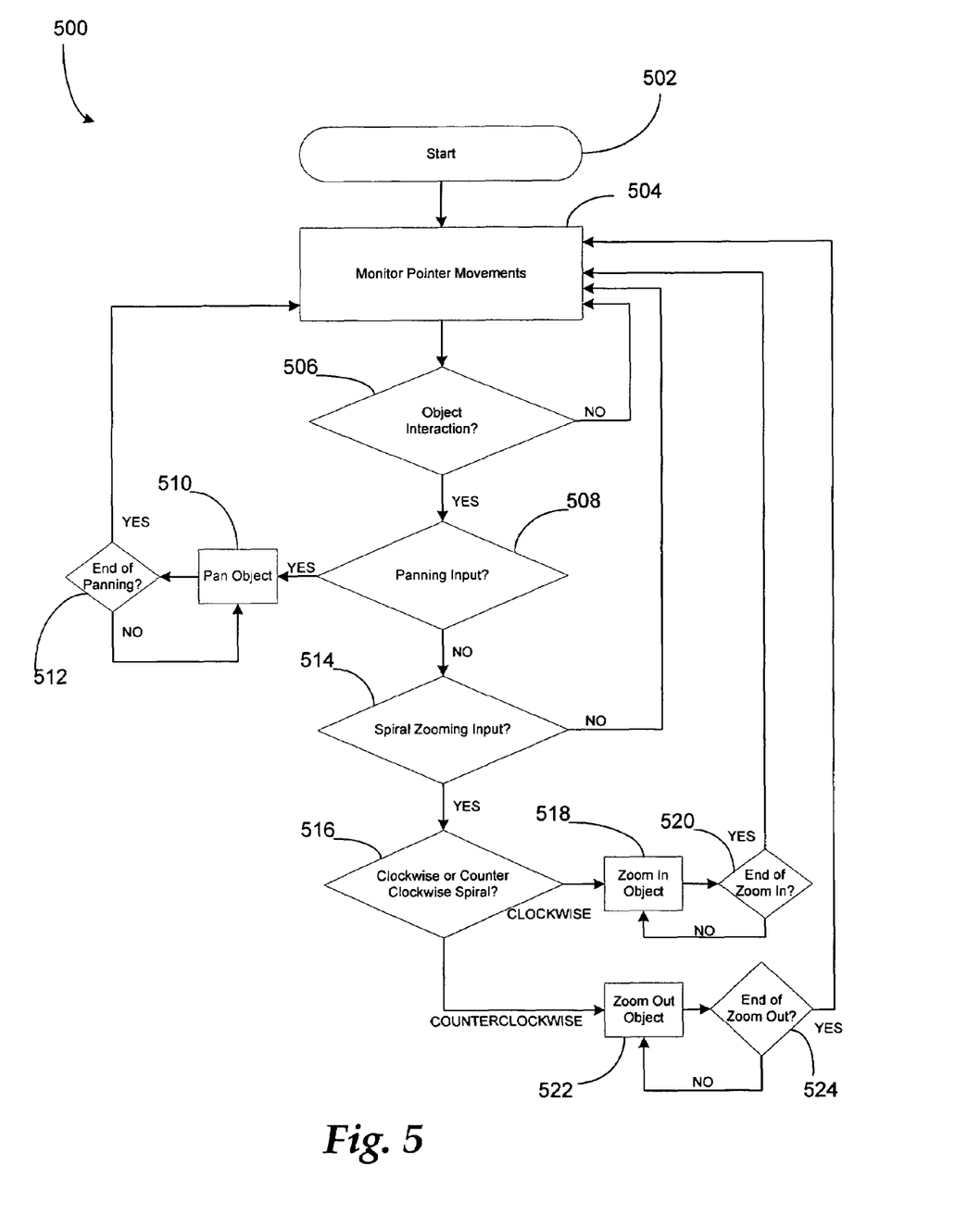
FIG. 5 represents an exemplary logical flow diagram of one embodiment for zooming an object through spiral interaction.

FIG. 5 represents a logical flow diagram of one embodiment of zooming an object through spiral interaction. Process 500 starts at starting block 502 and flows to block 504 where pointer movements are monitored. In one embodiment, pointer movements are monitored through sampling. Sampling may include storing the position of a pointer over time. The position of the pointer over time may further include storing X and Y coordinates associated with a rectangular coordinate system.

At decision block 506, process 500 determines if the pointer is interacting with an object. An object may include any computer object that is movable or zoomable on a display. Such objects may include, maps, pictures, drawings, photographs, icons, text, etc. If the pointer is not interacting with an object, process 500 loops back to block 504 where pointer movements are monitored. If the pointer is interacting with an object, process 500 continues to block 508 where process 500 determines if the pointer movement is a panning input.

A threshold may indicate the panning input. In one embodiment, the threshold is determined by the change of angular degree from horizontal as stated above. Some factors that may be considered when setting a change of angular degree threshold are resolution, pixel characteristics, input speed capabilities, and sample rate. Other factors may be included in the threshold as long as the threshold distinguishes a non-spiral input from a spiral input. If the movement is under the threshold, process 500 continues to block 510 where the object may be panned. At decision block 512, process 500 determines if the panning input is over. If the panning input is not over, the process loops back to block 510 where panning continues. If the panning input is complete, process 500 loops back to block 504 where pointer movements are monitored.

When the pointer input is not a panning input, process 500 continues to block 514 where it is determined whether the movement is a zooming input. A threshold may indicate the zooming input. The threshold may include the change of angular degree between pointer position. If the movement is not above the threshold, process 500 continues to block 504 where pointer movements are monitored. If the movement does indicate a zooming input, process 500 continues to decision block 516 where it is determined if the zooming input is clockwise spiral or counterclockwise spiral. In one embodiment, a clockwise spiral zooms an object inwardly as indicated by block 518. From block 518, process 500 continues to block 520 where it is determined if the zoom-in function has ended. If the zoom-in function has not ended, process 500 loops back to block 518 where the zoom-in function continues. If the zoom-in function has ended, process 500 loops back to block 504 where pointer movements are monitored.

If at decision block 516 process 500 determines that the spiral is counterclockwise, the object is zoomed outwardly as indicated by block 522. From block 522, process 500 continues to block 524 where it is determined if the zoom-out function has ended. If the zoom-out function has not ended, process 500 loops back to block 522 where the zoom-out function continues. If the zoom-out function has ended, process 500 loops back to block 504 where pointer movements are monitored. In this manner, the present invention provides three-dimensional movement with a two-dimensional pointer.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for spiral zooming. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for spiral zooming.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for interacting with an object through spiral interaction, comprising:
   providing an interactable object within a display;
   selecting the interactable object, wherein the selected interactable object is movable within the display while being selected by a pointer;
   monitoring pointer movements associated with the interactable object that is being selected by the pointer, wherein monitoring pointer movements includes sampling the pointer movements to determine pointer positions during a period of time;
   determining when the pointer movements associated with the interactable object that is being selected by the pointer indicate a spiral input, wherein determining when the pointer movements associated with the interactable object that is being selected by the pointer indicate a spiral input includes,
      determining straight lines that connect consecutive pointer positions,
      obtaining a reference angular degree, wherein the reference angular degree is the same for each pointer position,
      determining an angular degree from the determined straight line to the reference angular degree for each of the pointer positions,
      determining a change in angular degree from the determined angular degrees for each of the pointer positions,
      indicating a spiral input when the change in angular degree between consecutive pointer positions exceeds a change in angular degree threshold; and
   zooming the interactable object that is being selected by the pointer within the display when the spiral input is indicated.

2. The computer-implemented method of claim 1, wherein zooming the object when the spiral input is indicated further includes zooming the object inwardly in response to a clockwise spiral input.

3. The computer-implemented method of claim 1, wherein zooming the object when the spiral input is indicated further includes zooming the object outwardly in response to a counterclockwise spiral input.

4. The computer-implemented method of claim 1, further comprising determining when the pointer movements indicate a non-spiral input; and panning the object in response to the non-spiral input.

5. The computer-implemented method of claim 1, wherein the pointer position is associated with at least one of: a rectangular coordinate system and a polar coordinate system.

6. The computer-implemented method of claim 1, further comprising determining a counterclockwise spiral input by determining a negative change in angular degree that exceeds the change in angular degree threshold and a clockwise spiral input by determining a positive change in angular degree that exceeds the change in angular degree threshold.

7. The computer-implemented method of claim 1, wherein the change in angular degree threshold is determined based on at least one of: resolution, pixel characteristics, input speed capabilities, and sample rate.

8. The computer-implemented method of claim 6, further comprising:
   invoking a function to zoom the object inwardly when a clockwise spiral is indicated;
   invoking a function to zoom the object outwardly when a counterclockwise spiral is indicated; and
   invoking a function to pan the object when a non-spiral input is indicated.

9. A computer-readable storage medium having computer-executable instructions for performing operations to provide three-dimensional interaction with a two-dimensional input, the operations comprising:
   providing an interactable object within a display;
   selecting the interactable object, wherein the selected interactable object is movable within the display while being selected by a pointer;
   determining when a pointer movement associated with the interactable object that is being selected by the pointer indicates a spiral input, wherein determining when a pointer movement associated with the interactable object that is being selected by the pointer indicates a spiral input includes,     determining straight lines that connect consecutive pointer positions,     obtaining a reference angular degree, wherein the reference angular degree is the same for each pointer position,     determining an angular degree from the determined straight line to the reference angular degree for each of the pointer positions,     determining a change in angular degree from the determined angular degrees for each of the pointer positions,     indicating a spiral input when the change in angular degree between consecutive pointer positions exceeds a change in angular degree threshold; and zooming the interactable object that is being selected by the pointer within the display when the spiral input is indicated, wherein the interactable object that is being selected by the pointer is zoomed relative to the display.

10. The computer-readable storage medium of claim 9, wherein zooming the object further includes zooming the object inwardly in response to a clockwise spiral input.

11. The computer-readable storage medium of claim 9, wherein zooming the object further includes zooming the object outwardly in response to a counterclockwise spiral input.

12. The computer-readable storage medium of claim 9, further comprising:

panning the object associated with the pointer movement when the pointer movement does not indicate a spiral input.

13. A computing apparatus for zooming an object through spiral interaction, comprising:

a selection means for selecting an interactable object, wherein the selected interactable object is movable within a display while being selected by the selection means;

a monitor means for monitoring selection means movements associated with an interactable object that is being selected by the selection means within the display, wherein the monitor means samples the selection means movements during a period of time to determine selection means positions;

an interpreter means for identifying a spiral movement from the selection means movements, wherein the interpreter means determines a line connecting consecutive sampled selection means positions, determines an angular degree for a reference angle to each line, wherein the reference angle is the same for each line, determines a spiral input from a change in angular degree between the reference angle to each line, and indicates the spiral input when the change in angular degree between consecutive pointer positions exceeds a change in angular degree threshold; and     a zooming means for zooming the interactable object that is being selected by the selection means within the display when the spiral movement is indicated.

14. The apparatus of claim 13, further comprising a panning means for panning the object when a non-spiral movement is indicated.

15. The apparatus of claim 13, wherein the zooming means further comprises a clockwise zooming means for zooming an object inwardly when a clockwise spiral movement is indicated and a counterclockwise zooming means for zooming an object outwardly when a counterclockwise spiral movement is indicated.

* * * * *